United States Patent [19]

Schmid

[11] Patent Number: 4,643,836

[45] Date of Patent: Feb. 17, 1987

[54] RADIAL FLOW FILTER HAVING AIR FLUIDIZING BACKWASH MEANS

[76] Inventor: Lawrence A. Schmid, 5000 Coachmen Rd., Manhattan, Kans. 66502

[21] Appl. No.: 782,352

[22] Filed: Oct. 1, 1985

[51] Int. Cl.$^4$ .................... B01D 27/12; B01D 29/08; B01D 29/38

[52] U.S. Cl. .................................. 210/795; 210/277

[58] Field of Search ............... 210/275, 277, 279, 795, 210/793, 794, 276

[56] References Cited

U.S. PATENT DOCUMENTS 3,260,366 7/1966 Duff et al. .......................... 210/795

Primary Examiner—Frank Sever
Attorney, Agent, or Firm—Schmidt, Johnson, Hovey & Williams

[57] ABSTRACT

A filter for removal of suspended solids from fluids utilizes pressurized air for fluidizing filter media as the latter is exposed to backwashing water. The filter includes a casing having upright walls defining an annular chamber in horizontal cross-section, and a portion of the walls have openings that are pervious to liquid and substantially impermeable to the media particles. The flow of the backwash water is directed toward the upright, outer casing wall such that the backwash water flows at a direction at an angle relative to the upward flow of the pressurized air in the bed as the particles are fluidized, to facilitate removal of the accumulated solids without enabling escape of the media particles. Desirably, pressurized air is introduced into the chamber at vertically spaced locations to insure complete fluidization. Moreover, a cylindrical conduit is disposed within the media and surrounds the upper, pressurized air outlet aperture to provide a recirculation path for a portion of the media particles. In preferred forms, the filtering media is a mixture comprised of about 60% by weight of anthracite coal and about 40% by weight of anhydrous aluminum silicate, and the mixture is substantially of a screen size ranging from −18 U.S. sieve mesh to +25 U.S. sieve mesh.

9 Claims, 5 Drawing Figures

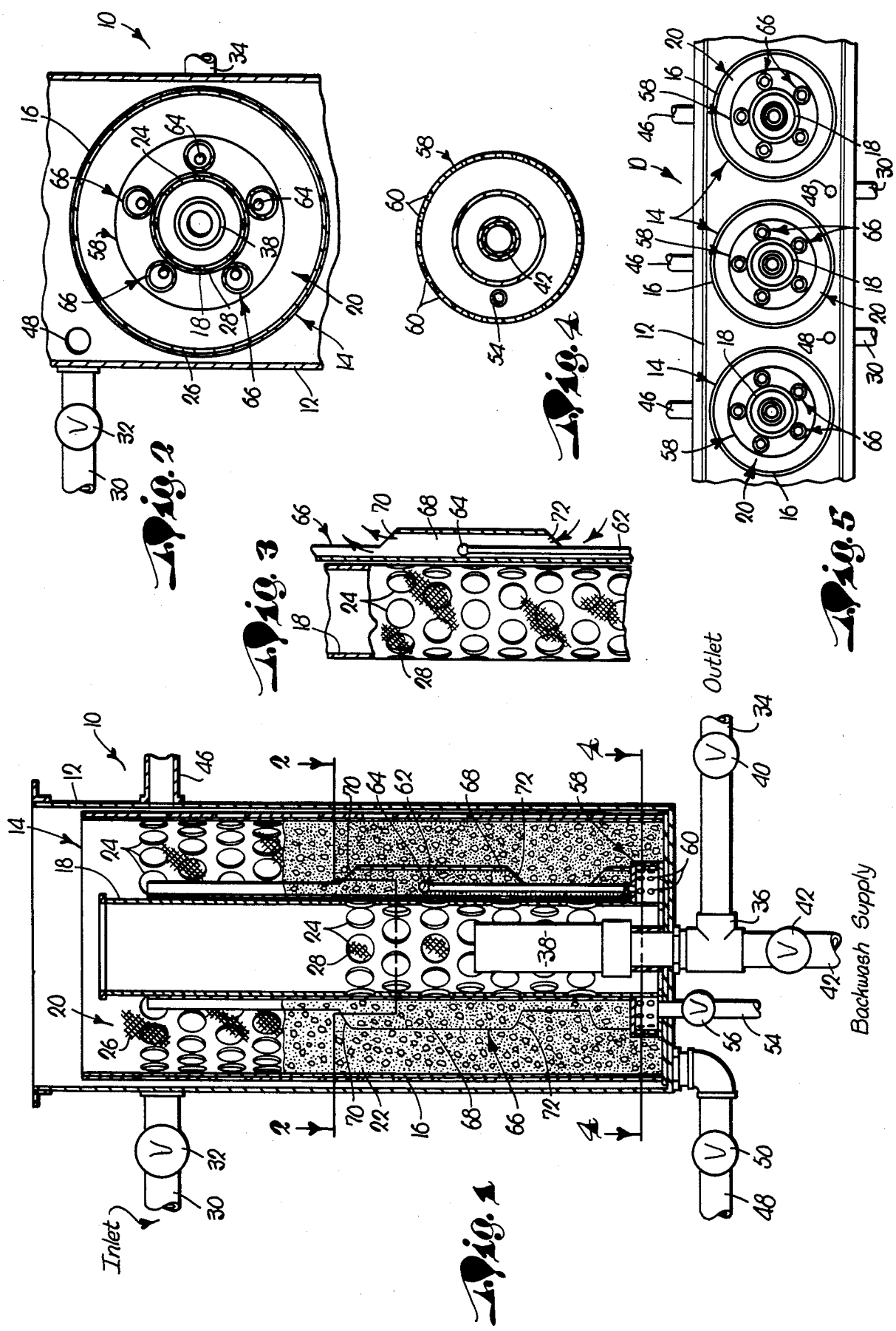

4,643,836

RADIAL FLOW FILTER HAVING AIR FLUIDIZING BACKWASH MEANS

BACKGROUND OF THE INVENTION

1. Field of the Invention

This invention relates to a radial flow water filter having a casing defining an upright, annular in cross-section chamber. The filter has an air distributor for fluidizing filter media particles within the chamber during introduction of backwash fluid, the latter of which flows radially along a path at an angle to the fluidized motion of the particles.

2. Description of the Prior Art

Separation of solids from liquids is commonly achieved by utilization of a filter having a filtration media comprised of discrete particles. Oftentimes, filtration is accomplished by downflow or gravitational movement of contaminated water through a horizontal, rectangular bed of sand supported by a bed of gravel. As the water moves through the voids in the filter, separation of solids occurs due the mechanisms of straining, flocculation and/or sedimentation.

Conventional downflow filters make effective use of only the top few inches of the bed, even though the latter may be two feet or more in depth. After a period of time (which is dependent upon the incoming rate of solids), the filter becomes plugged to a degree such that an excessive resistance to the incoming flow of water is presented. At this time, the flow of influent water is interrupted, whereupon the bed is taken out of service for cleansing.

Typically, particulate media filters are cleaned by a process known as backwashing, wherein a large quantity of water is directed through the filter in reverse flow direction to flush off the suspended solids that have accumulated in the voids between the sand. The clean backwash water, which often is previously treated water held in storage, is directed up through the filter bed, and the water along with the flushed solids flow over the top of the bed and toward a second storage receptacle. Subsequently, the used backwashing water must be sent back to the treatment plant for reprocessing.

As should be obvious, it is desirable to reduce the quantity of backwash water that is required to properly cleanse the filter, as well as the amount of time that the filter is out of service for backwashing. The volume of the storage tanks required for backwasing is directly related to the volume of water required for backwash. Moreover, flow of used backwash water back to the plant for reprocessing reduces the amount of incoming contaminated water that the plant could otherwise treat, such that the overall capacity of the plant is correspondingly reduced.

In particular, the backwashing operation is particularly critical in waste water treatment plants. Oftentimes, the backwashing fluid directed back to the plant for reprocessing creates a hydraulic overload, which upsets the plant and results in additional solids being directed toward the filter. Consequently, backwashing must occur at more frequent intervals, proportionately raising the amount of water necessary for reprocessing. A cycle thus begins that can disastrously result in plant failure and consequential pollution of the receiving stream.

In the past, various attempts have been made in an effort to reduce the quantities of water required for proper backwashing as well as the amount of time that the filter is out of service. In some instances, pressurized air is introduced through a plurality of nozzles disposed at the horizontal bottom surface of a conventional rectangular sand filter, such that the air agitates the surrounding said particles as well as the filtered solids. However, it has been found that such a filter bed cannot be maintained in a state of fluidization by the air during backwashing, since the agitation often causes the sand to flow over the top of the filter bed along with the backwashing water.

As can be appreciated, it would be a desirable advance in the art if means were provided to efficiently cleanse a filter using a minimum quantity of backwash water as well as a minimum amount of time that the filter is out of service.

SUMMARY OF THE INVENTION

The present invention overcomes the abovenoted disadvantages of the prior art by provision of a novel filter having air fluidizing backwash means. Utilization of such a filter in a conventional plant can greatly increase the plant efficiency and thus lower operating costs.

In more detail, the filter of the instant invention has a casing which includes an upright outer cylinder as well as an upright, concentric inner cylinder. A bed of filter media is comprised of discrete particles and is disposed in the chamber between the outer and inner cylinder. Both cylinders are provided with openings that are pervious to liquid and substantially impermeable to the filter media. In normal operation, the incoming water to be treated is introduced into a housing surrounding the outer cylindrical casing, and the water is filtered by the media as the water flows radially inward toward the innermost cylinder. During backwashing, clean water is introduced into the inner cylinder and the water then flows radially outward through the outer cylinder and toward the area contained by the housing.

Advantageously, the fluidizing means comprises a piping means enabling pressurized air to fluidize the particulate filter media during the backwashing process. Since the pressurized air tends to rise in the submerged bed, the flow of backwash fluid is thus at an angle relative to the flow of the air so that the filter particles are not carried out over the top of the casing. The generally horizontal flow of the backwash fluid quickly and efficiently carries out the accumulated solids in the bed as the latter is fluidized, so that a minimum quantity of backwash water is utilized.

In preferred forms, the piping means is operable to discharge pressurized air at a first location in the media and at a second location in the media, wherein the second location is vertically spaced from the first location. Such disposition of the air outlets has been found to substantially increase the likelihood that the entire bed is sustained in a homogenously fluidized state.

In other forms of the invention, a portion of the fluidized air is discharged within an elongated, open-ended upright conduit positioned within the bed. Initially, pressurized air fluidizes the particles within the conduit, enabling some of the particles to escape through the upper open end while simultaneously causing additional particles to be drawn into the conduit through the lower open end. As a result, the conduit is operable to facilitate recirculation of the media particles in the chamber to enhance the fluidization of the entire bed and thereby improve the efficiency of the backwashing operation.

Moreover, the annular configuration of the casing chamber enables the filter to present a variable filter face or surface that is automatically adjusted according to variations in flow rate through the filter. For example, as the flow rate of the incoming contaminated water increases, the level of water in the housing rises, exposing more of the filter media to the liquid. This multiple filtration rate helps prevent solids that have previously been strained and deposited in the media from being flushed through to the effluent with a sudden increase of feed water, since the additional feed water can instead be accomodated by previously unused filter media in upper portions of the chamber. In contrast, an increase in water flow in a conventional downflow filter results in a surge on all of the upper surface portions of the filter, such that the effectiveness of the filter is somewhat reduced.

Best results are obtained when the filter media is comprised of a mixture of about 60% by weight of anthracite coal and about 40% by weight of anhydrous aluminum silicate. Preferably, the media mixture is substantially of a screen size ranging from −18 U.S. sieve mesh to +25 U.S. sieve mesh. Such a mixture promotes good "boiling" action during the fluidization process, as the coal acts as a lubricant to provide separation between the aluminum particles.

BRIEF DESCRIPTION OF THE DRAWINGS

FIG. 1 represents a fragmentary, side cross-sectional view of the filter bed of the instant invention, showing the outer rectangular housing as well as the casing comprised of a pair of concentric, upright cylinders;

FIG. 2 is a fragmentary, horizontal, offset sectional view taken substantially along line 2—2 of FIG. 1;

FIG. 3 is a fragmentary, offset side view, partially in section, of the inner cylinder of the instant invention as well as one of the recirculating conduits;

FIG. 4 is a horizontal sectional view taken substantially along line 4—4 of FIG. 1, illustrating the air distributor as well as a lower portion of the inner cylinder; and FIG. 5 is a reduced, fragmentary plan view of the filter assembly of FIG. 1, showing the rectangular housing surrounding a plurality of the ring-like filter media casings.

DETAILED DESCRIPTION OF THE DRAWINGS

The filter assembly of the instant invention is designated broadly by the numeral 10 and is best shown in FIG. 5. The assembly 10 includes an upright housing 12 that is rectangular in horizontal section. Within the housing 12 are a plurality of casings 14 disposed in upright, side-by-side, spaced relationship.

Each of the casings 14, as illustrated in FIGS. 1, 2 and 5, comprises an outer, elongated, upright cylindrical wall 16 and an inner, elongated, upright cylindrical wall 18 positioned in spaced, concentric relationshp to the outer wall 16. Walls 16, 18 thus define a chamber 20 having an annular configuration in horizontal section. The quantity of filtering media 22 disposed in the chamber 20 is comprised of discrete particles as will be described in more detail hereinafter.

As best shown in FIG. 1, the walls 16, 18 are provided with a plurality of circular openings 24. Moreover, the inner surface of the outer wall 16, as well as the outer surface of the inner wall 18, are provided with screens 26, 28 respectively so that the openings 24 are thereby substantially impermeable to the flow of media particles 22 while being generally pervious to the flow of liquids therethrough.

Referring now to FIGS. 1, 2 and 5, it can be seen that an inlet 30 for normally admitting contaminated water to the filter assembly 10 is disposed on an upper portion of the housing 12 and is controllable by means of a valve 32. An outlet 34 communicates with a tee 36 that is, in turn, connected to a standpipe 38 concentrically positioned within the central area bounded by the inner wall 18. A valve 40 enables discharge of cleaned water from the assembly 10 through the outlet 34.

A backwash supply inlet means 42 is adapted for connection with a source of pressurized backwash liquid and includes a valve 44 that is coupled to the tee 36. An overflow drain 46 is disposed on an upper portion of the housing 12 for enabling discharge of backwash fluid from the assembly 10. Additionally, an end-of-cycle backwash drain 48 has a valve 50 and is connected to the bottom of the housing 12 in an area external of the casing outer wall 16.

A fluidizing means 52 is operable to selectively introduce pressurized air into the voids between the media particles 22 for fluidizing the latter. The fluidizing means 52 includes a piping means 54 having a valve 56 communicating with an annular distributor 58. As best shown in FIG. 1, a plurality of orifices 60 are circumferentially disposed around an outer periphery of the distributor 58 and are covered by a screen (not shown in detail) having openings generally impermeable to the media particles 22.

Five upright tubes 62 are secured to the distributor 58 to enable passage of air toward an upper outlet aperture 64 corresponding to each of the tubes 62. Thus, the piping means 54 is operable to discharge pressurized air at a first location in the media adjacent the distributor 58 as well as a second location in the media adjacent the apertures 64, where the first location is vertically spaced from the second location.

The fluidizing means 52 also includes five conduit means 66 each defining an elongated, upright passageway disposed in the chamber 20. As best illustrated in FIG. 1, each of the conduit means 66 is constructed from a tubular, cylindrical conduit 68, an upper portion of which is removed to define an outlet 70 communicating with the chamber 20. Also, a lower portion of the conduit 68 is cut away to define an inlet 72 disposed below the outlet 70 and also communicating with the chamber 20. As shown in FIGS. 1 and 3, the apertures 64 at the upper end of the tubes 62 are surrounded by a cylindrical portion of the conduit 68.

Operation

In normal use of the assembly 10, the valves 44, 50 as well as the air valve 56 are closed and the valves 32, 40 are opened. Contaminated water to be treated is introduced through the inlet 30 to the interior of the housing 12. The openings 24 in the outer wall 16 extend along the latter down toward a point adjacent the top of the distributor 58 for admission of fluid to the chamber 20. At the same time, the openings 24 in the inner wall 18 enable passage of water from the chamber 20 toward an area internal of the cylindrical inner wall 18.

The height of the standpipe 38 insures that the water level in the chamber 20 is continuously above the upper end of the standpipe 38. Thus, in normal use, a portion of the filtering media 22 below the upper end of the standpipe 38 remains in a constantly wetted condition.

During normal use of the assembly 10, contaminated water admitted to the housing 12 flows in a radially inward direction within the casing 14. The portion of the filter media 22 above the upper end of the standipe 38 is available for variable rate filtration, as may occur when a sudden inflow or surge of contaminated water is admitted to the housing 12. At the same time, the portion of the media 22 is above the upper end of the standpipe 38 can also be called into service whenever an excessive amount of solid contaminants accumulate in the lower portion of the media 22, causing the resistance to further flow in the lower portion to raise the water level in the housing 12 externally of the outer wall 16.

As can be appreciated, the utilization of the ring-like casing 14 thus provides a radial flow filter assembly 10 wherein the amount of filter media 22 that is presented to the incoming water is automatically variable depending upon the condition of the media 22 and also the flow rate of the incoming stream. Initially, substantially all of the filtering process will occur in a lower portion of the chamber 20. However, as filtered solids accumulated within the media 22, the resistance to water flow increases and thereby raises the level of water in the housing 12, exposing an additional quantity of media 22 to the incoming flow. Desirably, the openings 24 in the inner wall 18 are disposed below the upper level of the media 22, so that the incoming contaminated water cannot "short circuit" the media 22 and escape filtration.

As the solids continue to accumulate in the media 22, the water level in the housing 12 external of the outer wall 16 rises until a float switch (not shown) is activated to automatically close the valve 32 and thus interrupt the incoming flow of contaminated water so that the media 22 can be cleaned by a backwashing process. To initiate backwashing, the valve 40 is closed and the valve 44 is open to admit pressurized water within the inner cylindrical wall 18. At the same time, the valve 56 is opened to admit pressurized air to the distributor 58 as well as to the tubes 62.

Air that is discharged from the distributor 58 as well as the apertures 64 fluidizes the filtering media particles 22 during the backwashing process. Clean water from the interior of the inner wall 18 flows through the violently boiling media 22, flushing and rubbing the accumulated solids from the media 22 and directing the solids through the openings 24 in the outer wall 16. The level of the contaminated backwash water rises in the housing 16 until reaching the level of the overflow drain 46. Thus, it can be seen that the backwash water flows in a direction at an angle relative to the upward flow of pressurized air in the media 22 as the latter is fluidized, such that the media 22 is not directed over the top of the casing 14 as in known prior art filters.

It has been found that the location of the apertures 64, being vertically spaced above the orifices 60 and the distributor 58, facilitates fluidization of the media particles 22 to a degree such that fluidization occurs homogenously throughout the chamber 20 without excessive "slugging". Consequently, the quantity of water required to completely cleanse the media 22 is reduced substantially in comparison to certain prior art filters, wherein the water itself often was utilized in an attempt to fluidize the entire media bed.

Additionally, the provision of the conduit 68 greatly facilitates recirculation of the media particles 22 in the chamber 20 during fluidization. Air that is discharged through the apertures 64 reduces the density of the bed, causing a portion of the particles 22 to rise toward the outlet 70. At the same time, additional quantites of the particles 22 are drawn in through the lower inlet 72, such that a complete recirculation loop is established. Provision of five, equally spaced vertical conduits 68 within the chamber 20 insures that the entire bed of media particles 22 continuously recirculates during fluidization. This process enhances the disintegration of media particles 22 that have become excessively packed. Moreover, recirculation of the particles 22 assures that once the backwashing process is complete and the fluidization is interrupted, the size distribution of the particles 22 is uniform through the entire area of the chamber 20.

Once the media particles 22 have been sufficiently cleansed, the valves 44, 56 are closed to interrupt the flow of backwash water and fluidizing air respectively. Next, the valve 50 is opened to drain the remaining contents within the housing 12 below the overflow drain 46. Subsequently, the valve 50 is shut and the valves 32, 40 are opened to effectively put the filter assembly 10 back into service.

The filter media 22 is a mixture of anthracite coal and anhydrous aluminum silicate. The aluminum compound is very abrasive and, by itself, tends to bind together and not fluidize easily. It is also noted that anthracite coal has an angular configuration and alone does not smoothly fluidize. However, it is believed that the anthracite coal acts as a lubricant to provide good separation between the aluminum silicate particles, so that an efficient, smooth fluidization is thereby ensured.

Preferably, the filter media mixture 22 is comprised of about 60% by weight of coal and 40% by weight of aluminum silicate. However, satisfactory results may be obtained whenever the weight of coal is about 40% to about 80% of the total weight of the coal/aluminum silicate mixture.

Furthermore, it is preferably that the mixture is of a screen size from $-18$ U.S. sieve mesh to $+25$ U.S. sieve mesh. However, good results are obtained whenever the mixture is substantially of a screen size ranging from $-14$ U.S. sieve mesh to $+40$ U.S. sieve mesh.

From the foregoing, it is clear that the invention provides especially effective means for backwashing water treatment filter media, and does so in a manner to assure utilization of minimum quantities of backwash water as well as relatively small amounts of time that the filter is out of service. It is recognized, of course, that those skilled in the art may make various modifications or additions to the preferred embodiments chosen to illustrate the invention without departing from the gist and essence of the contribution to the art. Accordingly, it is to be understood that the protection sought and to be afforded thereby should be deemed to extend to the subject matter claimed and all equivalents thereof fairly within the scope of the invention.

I claim:

1. A filter, comprising:
   a casing having walls defining an upright chamber for receiving a quantity of particulate filtering media such that the media presents an upright filtering surface;
   respective fluid inlet and outlet means operatively coupled with said casing and communicating with said chamber for passage of fluid to be filtered into said chamber, through said media for entrapment of unwanted materials therein, and out of said chamber as filtered fluid; and means for compensating for surge flows of said fluid and saturation of lower portions of said media with entrapped materials by adjusting the amount and portions of said filtering surface and media exposed to said fluid to be filtered during operation of the filter, said compensating means including means coupled with said inlet and outlet means for nonpressurized, gravity flow of said fluid to be filtered from an elevated inlet point to a lower outlet point, said inlet and outlet means being laterally offset from each other with said upright filtering surface located between the inlet and outlet means, for gravitational flow of said fluid to be filtered in a direction transverse to and through said upright filtering surface, and for enabling, as lower portions of the media become saturated with entrapped material or the filter experiences a surge of fluid flow, the level of fluid in said chamber increase and additional or different portions of said filtering face and media to be exposed to said fluid.

2. A filter as set forth in claim 1, said chamber being annular in cross sectional configuration, there being an outermost, annular in cross section fluid inlet zone in surrounding relationshiip to said chamber, and an inner, circular in cross section fluid chamber inboard of said chamber, whereby fluid to be filtered passes radially inwardly from said inlet fluid chamber to said inner chamber through said media chamber.

3. A filter as set forth in claim 1, including backwashing means, said backwashing means comprising means adjacent the bottom of said chamber and communicating with the interior thereof for introduction of pressurized air into the chamber in order to cause said air to pass upwardly through said media and thereby fluidize the same, and structure located above and separate from said air introduction means and communicating with the interior of said chamber, for selective introduction of pressurized backwashing liquid into said chamber at an angle relative to the upward passage of air through the media, there being means for simultaneous operation of said air introduction means and said liquid introduction means.

4. A filter as set forth in claim 3, said air introduction means including piping means operable to discharge said air at first and second locations in said media, said second location being spaced vertically above said first location.

5. A filter, comprising:

a casing having walls defining an upright chamber for receiving a quantity of particulate filtering media;

respective fluid inlet and outlet means operatively coupled with said casing for passage of fluid to be filtered into said chamber and through said media to entrap unwanted materials therein, and for passage of filtered fluid out of the casing; and means for backwashing said filter to remove said entrapped materials from said media using only a minimum of backwashing liquid, and for substantially preventing the loss of said filter media from said chamber, said backwashing means including means adjacent the bottom of said chamber and communicating with the interior thereof for selective introduction of pressurized air into the chamber in order to cause said air to pass upwardly through the voids between said media particles and to fluidize the media particles;

structure located above and separate from said air introduction means and communicating with the interior of said chamber, for selective introduction of pressurized backwashing liquid into said chamber at an angle relative to the upward passage of air through said media;

means for simultaneous operation of said air introduction means and said liquid introduction means, for enhancing the fluidization of said particles without substantially contributing to vertical uplift of the particles, and for enabling said particles to be prevented from leaving said chamber; and outlet means above said liquid introduction means for conveying material-laden backwashing fluid from said casing.

6. The filter as set forth in claim 5, said inlet and outlet means being laterally offset from each other, said media presenting upright filtering surface located between the inlet and outlet means.

7. The filter as set forth in claim 5, said air introduction means comprising typing structure for introducing air into said media at first and second points therein, said second point of introduction being vertically above the first point of introduction.

8. A method comprising backwashing a particulate filter bed to remove entrapped materials therefrom using only a minimum of backwashing liquid while preventing the loss of particulate from the bed, by the steps by introducing pressurized air into said bed at a lower region thereof, and allowing said air to pass upwardly through the media particles for fluidizing the same;

introducing pressurized backwashing fluid into said bed at a point above said air introduction region and at an angle relative to the upward passage of air through the bed, said air and water introduction steps being carried out simultaneously for enhancing said particulate fluidization without substantially contributing to vertical uplift of the particles, whereby said particles are prevented from leaving said bed; and passing said backwashing liquid from said bed at a location above said fluid introduction point.

9. The method as set forth in claim 8, wherein said air introduction step comprises the steps of introducing air into said bed at first and second locations, said second location being vertically spaced above said first location.

* * * * *